US006400899B1

(12) United States Patent
Chatterjee et al.

(10) Patent No.: US 6,400,899 B1
(45) Date of Patent: Jun. 4, 2002

(54) RING ASSEMBLY MANUFACTURING APPARATUS AND METHOD

(75) Inventors: Madhu Sudan Chatterjee; Steven J Schultz, both of Saginaw; David E. Witucki, Bay City, all of MI (US); Charles T Blue, Knoxville, TN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/670,669

(22) Filed: Sep. 27, 2000

(51) Int. Cl.$^7$ .................... H05B 3/00; B21D 53/00; B62D 5/04

(52) U.S. Cl. .................. 392/418; 219/201; 219/385; 29/895.212; 29/447; 180/443

(58) Field of Search .................. 392/407, 418, 392/416; 219/201, 200, 390, 521, 385; 29/893, 893.2, 894, 894.361, 895.212, 447, 448, 449, 238, 239; 180/443–446

(56) References Cited

U.S. PATENT DOCUMENTS

| | | | | |
|---|---|---|---|---|
| 1,617,152 A | * | 2/1927 | Gair | 29/447 |
| 1,947,462 A | * | 2/1934 | Doorbar | 29/447 |
| 2,001,204 A | * | 5/1935 | Long et al. | 29/447 |
| 2,733,380 A | * | 1/1956 | Phillips et al. | 29/447 |
| 2,752,668 A | * | 7/1956 | Sheen | 29/447 |
| 2,759,368 A | * | 8/1956 | Kitto | 29/894.361 |
| 2,787,956 A | * | 4/1957 | Kirby et al. | 29/447 |
| 3,427,434 A | * | 2/1969 | Gassaway | 29/447 |
| 3,718,957 A | * | 3/1973 | Shank | 29/447 |
| 3,724,059 A | * | 4/1973 | Celovsky | 29/426.1 |
| 4,025,751 A | * | 5/1977 | Wright | 219/216 |
| 4,070,920 A | * | 1/1978 | LeBlanc | 74/446 |
| 4,074,407 A | * | 2/1978 | Christensen | 29/894 |
| 4,270,378 A | * | 6/1981 | Brown et al. | 72/267 |
| 4,570,053 A | * | 2/1986 | Ades et al. | 219/413 |
| 4,847,962 A | * | 7/1989 | Puetz | 29/447 |
| 5,140,666 A | * | 8/1992 | Lamb | 392/360 |
| 5,216,798 A | * | 6/1993 | Sterling | 29/445 |
| 5,647,126 A | * | 7/1997 | Wei | 29/894.322 |
| 5,803,553 A | * | 9/1998 | Wei | 301/63.1 |
| 5,842,962 A | * | 12/1998 | Yamada et al. | 492/47 |
| 6,234,729 B1 | * | 5/2001 | Cook | 408/226 |

FOREIGN PATENT DOCUMENTS

| | | | | |
|---|---|---|---|---|
| DE | 19546917 | * | 6/1996 | |
| JP | 4-289764 | * | 10/1992 | 29/447 |
| JP | 9-120610 | * | 5/1997 | |
| JP | 9-285049 | * | 10/1997 | |
| SU | 761220 | * | 9/1980 | 29/447 |

* cited by examiner

Primary Examiner—John A. Jeffery
(74) Attorney, Agent, or Firm—Edmund P. Anderson

(57) ABSTRACT

A ring assembly manufacturing apparatus (30) and method provides heat to a ring (216) such as a polymeric ring from an infrared source (48). A ring assembly (214) includes a ring (216) and a hub (218) within the ring. The ring (216) is traversed into a chamber (46) such that the ring (216) is exposed to infrared energy from the infrared source (48). The infrared energy causes the ring (216) to expand thereby facilitating assembly with the hub (218).

21 Claims, 10 Drawing Sheets

RING ASSEMBLY MANUFACTURING APPARATUS AND METHOD

BACKGROUND OF THE INVENTION

The present invention relates to ring assemblies and ring assembly manufacturing methods and apparatus that employ the use of infrared energy.

Ring assemblies are commonly used as gears, for example, within electronic power steering systems. These ring assemblies may be "blank" in nature, where the blank is machined into a gear via subsequent processing. Alternately gear tooth geometry may be pre-existing in the ring and this process joins a gear ring to a structural hub. These gears can be various styles, for example, worm gears, spur gears, or face gears. Furthermore, ring assemblies are employed aside from gears, for example, in cam lobes, spacers, washers, flywheels or bushings. Ring assemblies are typically circular in shape; however, other shapes, including elliptical, oval, or triangular are commonly employed in various applications.

Certain ring assemblies include a ring of polymeric material having a central metal hub. Conventional manufacturing of such polymer ring/central metal hub assemblies is accomplished by securing the polymer ring over the metal hub, by, for example, traditional fastening means such as rivets or screws. Other techniques take advantage of the thermal expansion properties of the polymer ring. A polymer ring is placed in a heating device such as a furnace until the central opening has expanded sufficiently to be pressed fitted over a hub which has mechanical interlocking features on its perimeter (e.g., knurl or splines). Subsequent contraction of the polymer ring facilitates a reliable union between the ring and hub.

In an operation employing the latter method, typically, one or more rings are placed in a furnace chamber and heated by convection and radiation for about 1–1.75 hours. This amount of time is generally required to achieve a heat soak time of approximately 7–8 minutes. A "heat soak" occurs when the heat has diffused from the surface to saturate the body of the rings. After the rings have heated to achieve the required expansion, they are removed from the furnace and pressed over hubs. The gear assembly then is allowed to cool whereupon the ring shrinks and is affixed to the hub. The hubs can include features such as knurls, splines, or grooves where the molten material can adhere to hub providing robust attachment in both radial and transverse directions. The cooling time depends generally on the dimensions of the ring, as the entire ring is heated to temperature to achieve expansion. The manufacturing may also be accomplished using billets and tubes which are subsequently cut to dimension (e.g., by computer numerical control, or CNC, techniques).

Another process that may be employed to further adhere the polymer ring to the metal hub involves heat induction of the polymer ring/metal hub assembly. The hub having die ring press fitted thereon is placed inside an induction coil and an alternating current is introduced. The current causes the metal hub to heat, whereby the heated metal melts the polymer surface adjacent to it. The molten polymer flows into mechanical interlocking features on hub allowing for a strong bond between the metal hub and the polymer ring.

The conventional heating methods (i.e., radiation and convection) dictate the time required to heat the polymer ring to cause expansion sufficient to allow the polymer ring to be press fit over the metal hub. A method of manufacturing gear assemblies and a suitable apparatus that is capable of producing ring assemblies in less time and with fewer process steps is desirable.

SUMMARY OF THE INVENTION

The instant invention provides a method and apparatus for forming assemblies having a plurality of layers wherein one layer is fused or adhered to another layer. An apparatus is employed having one or more infrared sources therein to heat a ring, generally a polymeric ring, for expansion and of surface melting.

The infrared heating provides rapid, concentrated and selective energy to a region of the ring exposed to the energy. Where the inside diameter surface is exposed to the infrared energy, the central opening expands. When expanded, the ring is press fit over an inner ring such as a metallic hub. Upon cooling, the outer ring contracts and a strong bond is effectuated between the inner ring and the outer ring. Features can be provided on the outer edge surface of the hub (or inner ring) to enhance the bond.

The cooling time is relatively short in the process of the invention since the selective heating does not equally affect the entire ring. Therefore, the overall assembly time is decreased compared to conventional heating techniques. Furthermore, a bond is achieved that is uniform since the infrared energy can be directed to the portions of the ring that are to be adhered.

Another apparatus includes one or more infrared sources for heating a polymeric ring at the inside diameter surface and one or more infrared sources for heating the polymeric ring at the outside diameter surface. Both sets of sources allow the ring to expand such that it can be press fit over a metallic hub. This is particularly useful, for example, when more rapid thermal expansion is desired.

In another embodiment of the instant invention, an assembly line is provided having a chamber for expanding the polymeric ring with infrared energy and another device for press fitting the ring over a metallic hub. Alternatively, a lift device is configured to both introduce the ring into the infrared chamber and to the press fining device.

BRIEF DESCRIPTION OF THE DRAWINGS

The present invention will now be described, by way of example, with reference to the accompanying drawings, in which.

DETAILED DESCRIPTION OF THE INVENTION

Figure 1:
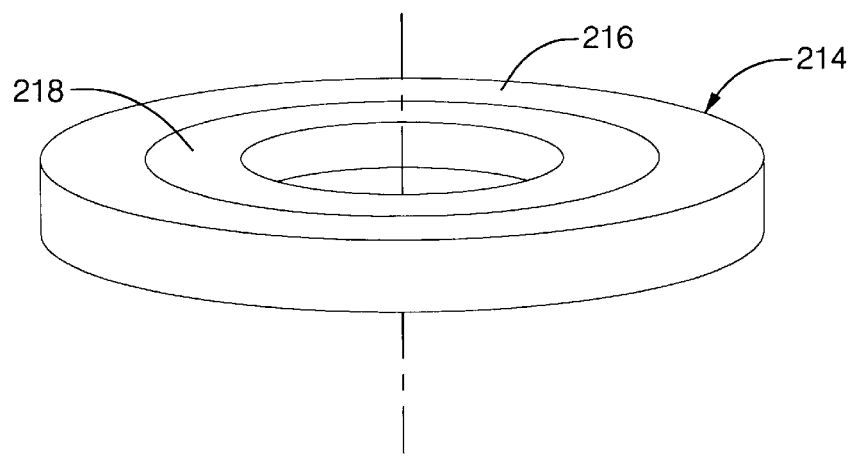
FIG. 1 is an isometric view of a ring assembly.

In an exemplary embodiment of the present invention, and referring to FIG. 1, a ring assembly 214 is depicted. Ring assembly 214 includes a ring 216 having a hub 218 positioned within a central opening of ring 216. Ring 216 is generally a component having an opening therein. In one embodiment, ring 216 is formed of a polymer including, but not limited to, nylon. Hub 218 is a component generally configured and dimensioned to be received within the opening in ring 216 after processing. In one embodiment, hub 218 is formed of a metal including, but not limited to, steel, iron or other ferrous metal, aluminum, or titanium. Alternatively, hub 218 can be formed of a ceramic or a polymeric material. In certain embodiments, it is preferred that hub 218 conduct heat.

Assembly 214 is used, for example, as a gear assembly, wherein teeth or other features (not shown) are provided on the outer diameter surfaces of ring 216, on a face of ring 216, or both on the outer diameter surface and face of ring 216. Such a gear assembly is employed in various mechanical applications such as automotive steering or transmission gear boxes. It is, however, contemplated that ring assembly 214 and the manufacturing apparatus and methods provided herein are not intended to be limited to those used as gear assemblies. For example, ring assemblies manufactured according embodiments of the present invention can be employed as cam lobes, spacers, washers, flywheels, or bushings.

Figure 2:
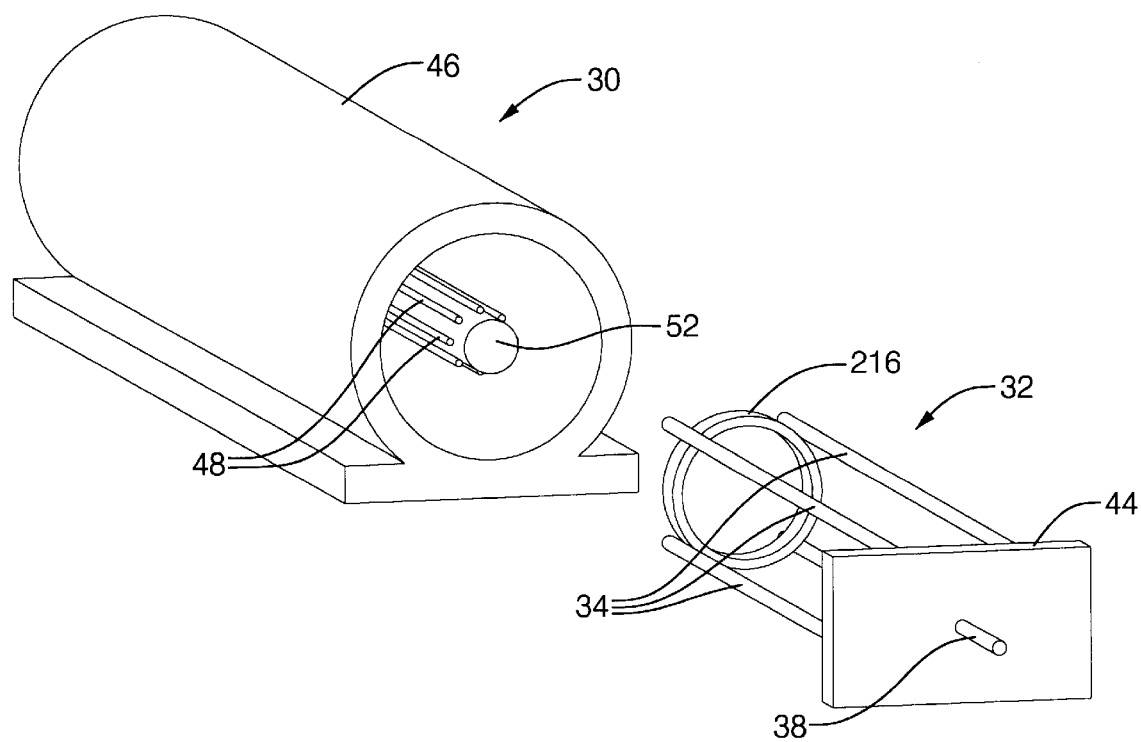
FIG. 2 is an isometric view of a furnace apparatus embodied by the present invention.
Figure 3:
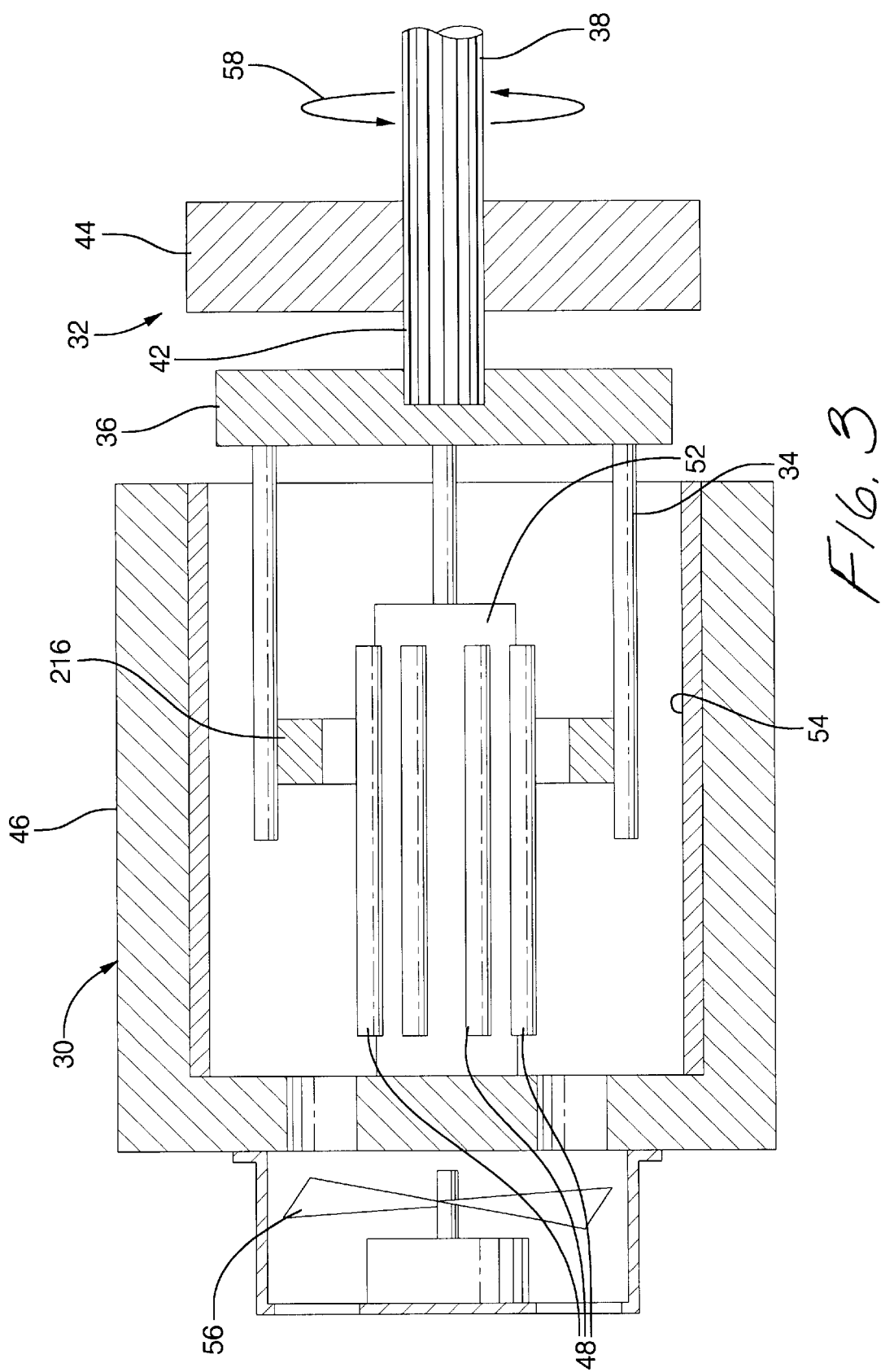
FIG. 3 is a sectional view of the furnace apparatus of FIG. 3.

Referring now to FIGS. 2 and 3, a furnace 30 and a furnace fixture 32 employed during assembly of ring assembly 214 according to an embodiment of the present invention are shown. Ring 216 is positioned on furnace fixture 32 for insertion within furnace 30. While ring 216 is illustrated having a circular geometry, it is important to note that the method and apparatus of the present invention may be employed to heat many other geometrical shapes with equally reliable and beneficial results. For example, elliptical gears, triangular gears, or other shaped gears are common in various fields and can be manufactured according to the present invention.

Furnace fixture 32 includes a plurality of fingers 34 supported by a finger support structure 36 which is mounted to a rotation shaft 38. Shaft 38 is supported in a shaft bearing package 42 which is mounted to a furnace fixture base 44. The components of furnace fixture 32 are preferably constructed of materials capable of withstanding concentrated heat generated within furnace 30. Preferred materials include but are not limited to steel or stainless steel. In one embodiment, a cool wall furnace is employed generally having an insulating material or other heat transferring means (e.g., water cooling) between an inside wall and an outside wall.

Furnace 30 includes a furnace housing 46 within which a plurality of infrared sources 48 are mounted to a support 52. Support 52 is preferably positioned in a location within housing 46 to facilitate a ring being positioned therearound such that on the interior surface of the ring is exposed to the infrared sources 48. A reflector 54 is positioned within housing 46 to advantageously reflect infrared energy emanating from infrared sources 48. A fan 56 is also provided to enhance even heating of the ring 216. Furnace housing 46 and support 52 are constructed of materials capable of withstanding the concentrated heat generated within furnace 30, such as steel, stainless steel or ceramic. Reflector 54 is constructed of a material capable of withstanding the concentrated heat generated within furnace 30 and also capable of reflecting the heat from furnace housing 46, such as aluminum or steel, generally to prevent the exterior of furnace housing 46 from heating.

Infrared sources 48 are generally cylindrically shaped tubes configured for power input and for emitting infrared energy. Infrared sources 48 in the form of cylindrical bulbs are employed generally because they are less expensive than infrared sources of unconventional shapes. However, it is contemplated that infrared sources 48 can be of any shape. For instance, infrared sources 48 can be shaped to conform to the shape of ring 216. Additionally, while the infrared sources depicted in the Figures generally have a high length to diameter ratio, it is contemplated that shorter infrared sources including spherical or bulbous shaped sources can be employed. Bulbs can made to contour around a part to achieve only selective heating.

Ring 216 is positioned within fingers 34. Fingers 34 are generally spring loaded to hold ring 216 at the end thereof. Furthermore, the flexibility of fingers 34 allows for expansion of ring 216 within furnace 30. The entire furnace fixture 32 including ring 216 positioned therein is introduced into furnace apparatus 30. In this embodiment, the inside diameter of ring 216 is directly exposed to infrared sources 48. It is contemplated that alternative fixtures can be used to hold ring 216 within furnace 30. For example, although four fingers 34 are shown in FIGS. 2 and 3, fewer or more fingers 34 can support ring 216. For example, a robotic arm (not shown) configured to hold ring 216 can be employed.

A heat cycle is commenced by powering infrared sources 48 with a conventional power source (not shown). The power source can provide a fixed voltage power output or a variable voltage power output. Preferably, a variable power output power source is employed to allow for process optimization by changing the input voltage to infrared sources 48 which varies the quantity of infrared energy emitted.

Infrared sources 48 are positioned in a radial arrangement upon the outer surface of support 52 and are held by conventional means such as brackets or clips (not shown). Support 52 is formed integrally with furnace housing 46. Reflector 54 is formed within the inner surface of furnace housing 46. Reflector 54 generally directs and concentrates the infrared energy from infrared sources 48 within furnace 30 and prevents furnace housing 46 from exposure to excessive infrared energy which would otherwise be conducted to the exterior surface of furnace housing 46. Furthermore, reflector 54 can be designed, for example, with concentric grooves to direct reflections of infrared energy from infrared sources 48 to ring 216.

To ensure uniform temperature rise throughout ring 216, after introduction into furnace 30, furnace fixture 32 having ring 216 therein is rotated via rotation shaft 38, generally in the direction shown by arrow 58. In one embodiment, this rotation is at a high speed. It is contemplated that different rotation means and speeds can be provided. For example, support 52 can be rotationally mounted within furnace housing 46, or a sleeve having one or more infrared bulbs mounted therein can be positioned over a support. Alternatively, the rotation means can be eliminated, for example, when uniformity of the temperature rise of ring 216 is not critical or when one or more infrared sources 48 emits a pattern infrared energy such that ring 216 is uniformly exposed.

Ring 216 is exposed to the infrared energy from infrared sources 48 until ring 216 has expanded sufficiently or until the inside diameter surface is in a molten or semi-molten state. Furnace fixture 32 is then removed from furnace apparatus 30. Optionally, fan 56 is activated to cool the furnace components including infrared sources 48, support 52 and reflector 54 between heat cycles. Of course, it is contemplated that the process timing can be adjusted to minimize the amount of cooling time required.

The time required to heat ring 216 such that the necessary expansion occurs depends upon factors including, but not limited to, the composition of ring 216, the capabilities of infrared sources 48, the quantity of infrared sources 48 employed, the rotational speed of furnace fixture 32, the amount of power supplied to infrared sources 48 and the design of reflector 54. Furnace 30 is capable of sufficiently heating ring 216 in fewer than 45 seconds.

Figure 4:
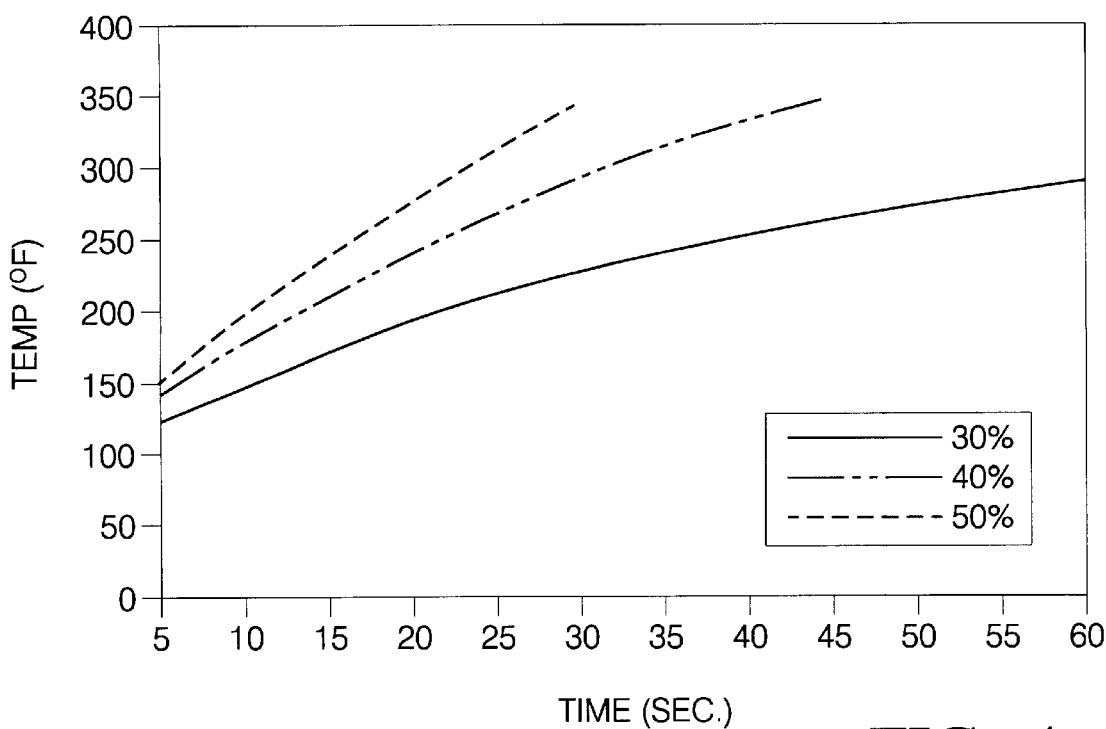
FIG. 4 is a plot of temperature rise over time for various infrared source intensities of the furnace apparatus of FIGS. 2 and 3.

Referring now to FIG. 4, optimization curves plot the time that infrared sources 48 arc activated against the temperature of the ring. A thermocouple is attached to the ring to determine the temperature. Three curves represent the various percent voltage outputs to infrared sources 48 based on 30%, 40% and 50% of the maximum voltage power output.

Figure 5:
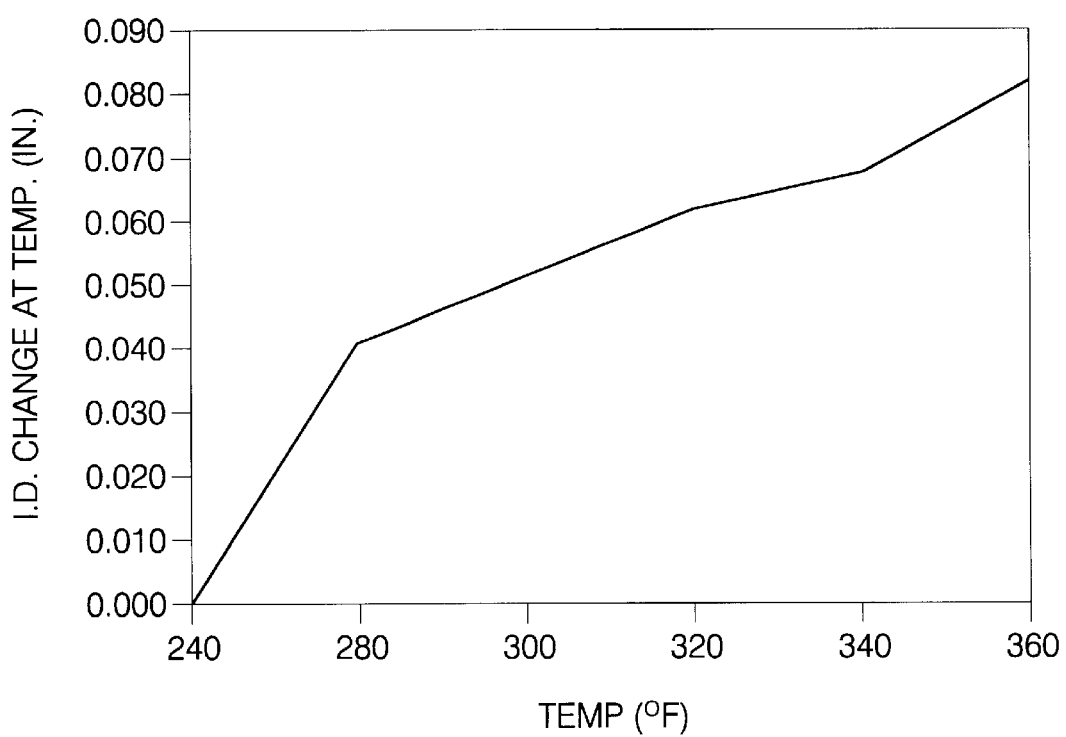
FIG. 5 is a plot of ring growth against temperature.

Referring to FIG. 5, the change of the inner diameter against the temperature of the ring is plotted. FIG. 5 can be used, for example, to determine to what temperature ring 216 must be heated before removal of furnace fixture 32, based on a desired inner diameter change. In one embodiment, the inside diameter of ring 216 is preferably expanded 2% of its inner diameter. In the ring used to formulate FIGS. 4 and 5, this is accomplished at approximately 320° F., which corresponds to approximately 25 seconds exposure at 50% maximum bulb voltage and to approximately 35 seconds exposure at 40% maximum bulb voltage.

Figure 6:
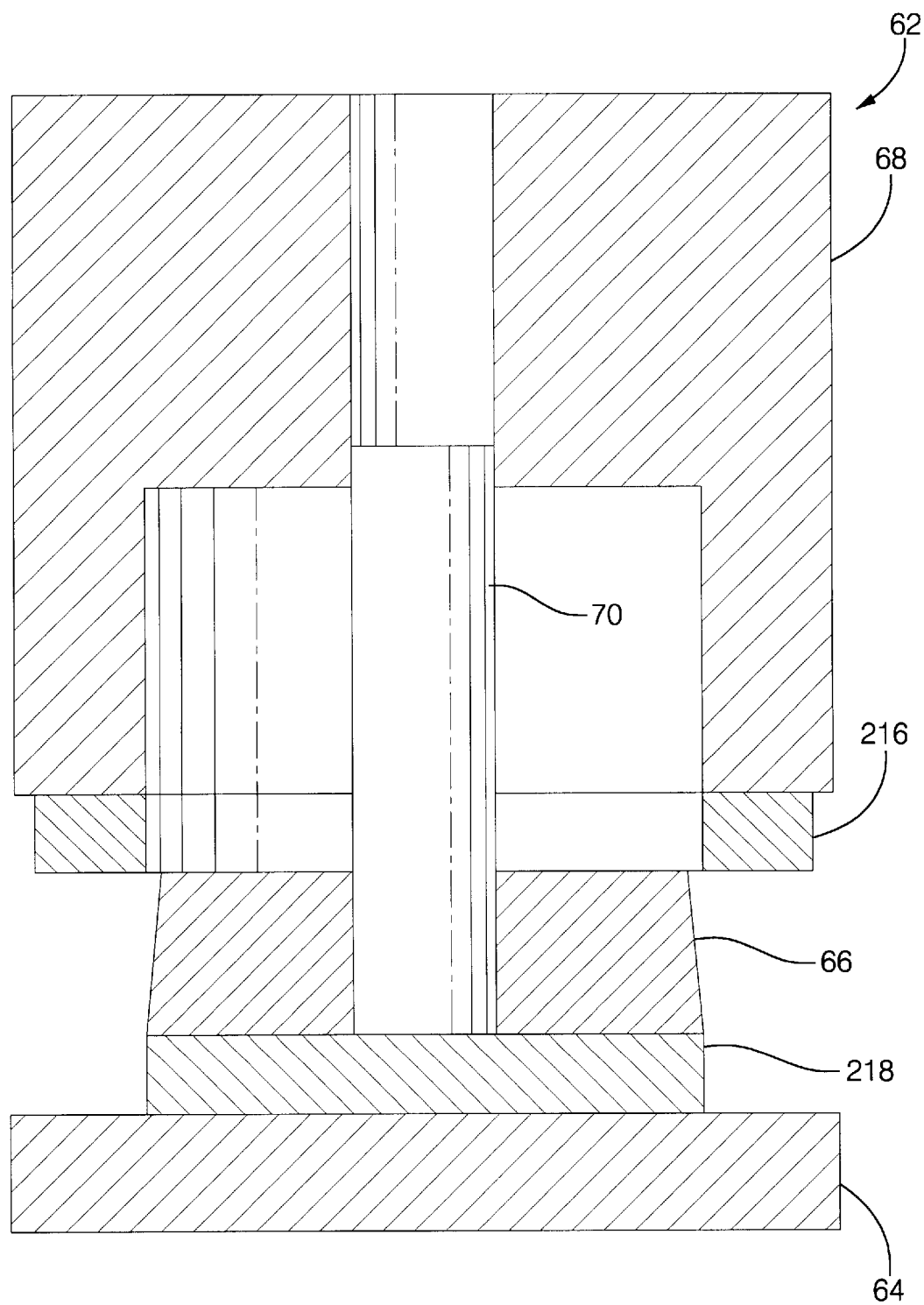
FIG. 6 is a sectional view of a press apparatus employed within certain embodiments of the present invention.

Referring now to FIG. 6, an exemplary assembly fixture 62 for press fitting ring 216 over hub 218 is depicted. Assembly fixture 62 comprises a base 64 for supporting hub 218 and a ring guide 66 for guiding ring 216. A press 68 is positioned to urge ring 216 over hub 218 guided by ring guide 66. When ring 216 is urged over hub 218 while still hot, ring 216 is generally expanded and can be press fit over hub 218 with relative case. In an alternative embodiment, the inside diameter surface of ring 216 is molten or semi-molten, wherein the molten material flows and adheres to hub 218. Where hubs 218 having features such as knurls or grooves are provided, the molten material flows into the recessed portions of the features.

Ring assembly 214 can be allowed to cool within assembly fixture 62 or ring assembly 214 can be removed from assembly fixture 62 and cooled separately. The required cooling time depends on the characteristics of the polymeric material and the quantity of polymeric material transformed to a molten or semi-molten state by the infrared energy.

Press 68 is driven by any suitable means, such as a hydraulic, mechanical, electromechanical, pneumatic, etc. drive. Hub 218, ring guide 66 and press 68 are aligned by arrangement on a centering post 70. Ring assembly 214, comprising ring 216 and hub 218, is then removed from assembly fixture 62.

It is to be understood that the method and apparatus described herein can be used to form ring assembly 214 by shrink fitting ring 216 over hub 218, wherein ring 216 is press fitted (e.g., with press 68). For shrink fitting, the exposed portion (e.g., the inside diameter) of ring 216 is generally heated to a temperature below the melting point of the material (e.g., heated to 320° F. for nylon having a melting point of 420° F.). Upon cooling, ring 216 contracts and secured hub 218 generally by mechanical forces of contraction.

Alternatively, the exposed portion (e.g., the inside diameter) of ring 216 is heated to a temperature at or approaching below the melting point of the material. Therefore, the exposed portion is melted or partially melted, and when ring 216 is press fit over hub 218, the molten material flows and bonds with the adjacent hub 218.

Figures 7, 8:
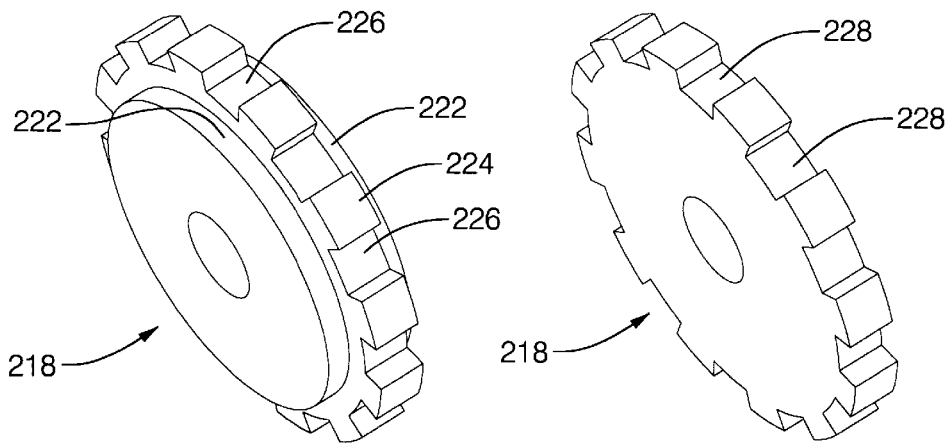
FIG. 7 depicts one feature that can be included on a hub according to an embodiment of the present invention.
FIG. 8 depicts another feature that can be included on a hub according to an embodiment of the present invention.
Figures 9, 10:
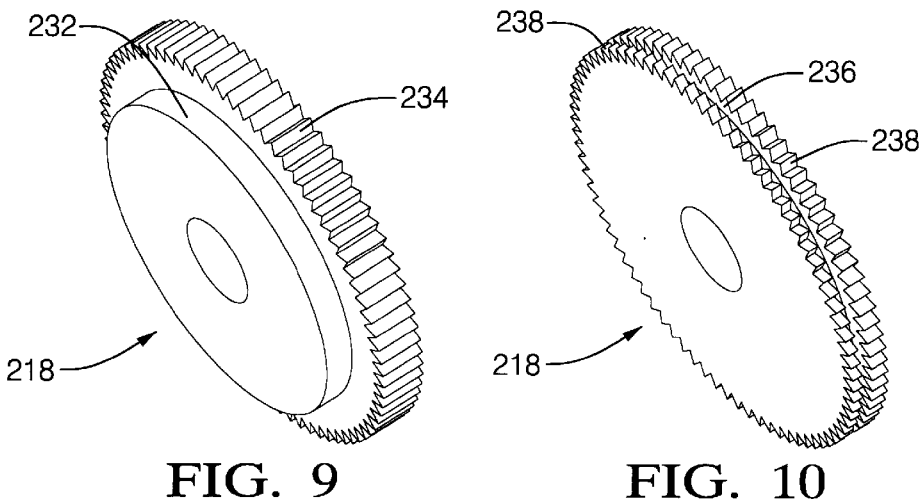
FIG. 9 depicts another feature that can be included on a hub according to an embodiment of the present invention.
FIG. 10 depicts another feature that can be included on a hub according to an embodiment of the present invention.
Figures 11, 12:
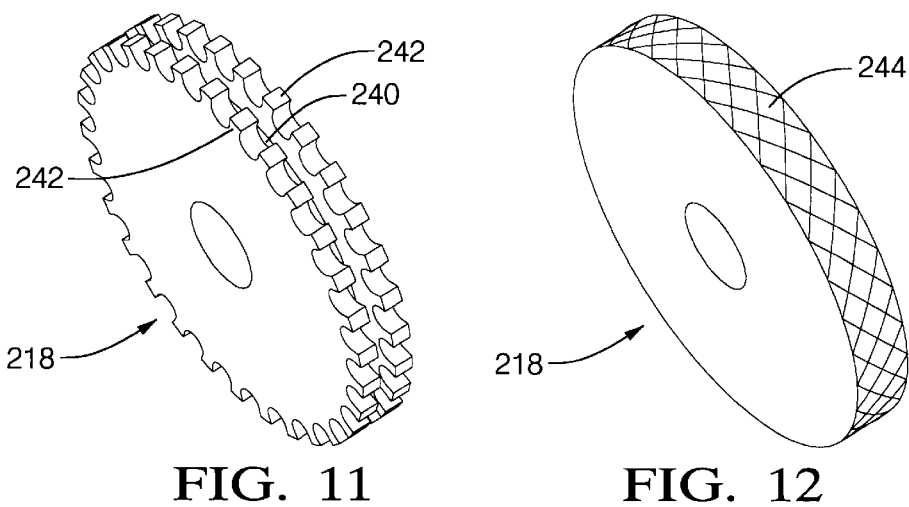
FIG. 11 depicts another feature that can be included on a hub according to an embodiment of the present invention.
FIG. 12 depicts another feature that can be included on a hub according to an embodiment of the present invention.

In the alternative embodiments employing melt adhesion, the outside diameter surface of hub 218 preferably includes features to enhance robust attachment of ring 216 and hub 218. Examples of such features are provided in FIGS. 7–12. FIG. 7 shows a hub 218 having a pair of recessed edge portions 222, an extended center portion 224 and a plurality of cut-out portions 226. The molten material from ring 218 flows into cut-out portions 226 and over recessed edge portions 222. FIG. 8 shows a hub 218 having a plurality of cut-out portions 228 wherein molten material from ring 216 flows. FIG. 9 shows a hub 218 having a pair of recessed edge portions 232 and a plurality of teeth 234. The molten material from ring 216 flows in between teeth 234 and over recessed edge portions 232. FIG. 10 shows a hub 218 having a recessed central portion 236 and a plurality of teeth 238 on opposite sides of central recessed edge portion 236. The molten material from ring 216 flows in between teeth 238 and into recessed central portion 236. FIG. 11 shows a hub 218 having a recessed central portion 240 and a plurality of rounded teeth 242 on opposite sides of recessed central portion 240. The molten material from ring 216 flows in between teeth 242 and into recessed central portion 240. FIG. 12 shows a hub 218 having a plurality of generally diamond-shaped protrusions 244. The molten material from ring 216 flows in between protrusions 244.

Furnace described above with respect to FIGS. 2 and 3 heats the inside diameter of ring 216. Heat is transferred from the inside diameter toward the outside diameter (the extent of which depends upon voltage, amperage and proximity of radiation sources and the desired degree of melting and/or expansion). However, the infrared sources can be arranged such that the outside diameter of ring 216 is directly exposed to the sources, wherein heat is transferred from the outside diameter toward the inside diameter. Alternatively, both the inside and outside diameters of ring 216 are exposed to the sources, wherein heat is simultaneously transferred from the outside diameter toward the inside diameter and from the inside diameter toward the outside diameter. The infrared energy emitted from die infrared sources can be varied, for example, wherein the rate of heating from the outside diameter toward the inside diameter is different than the rate of heating from the inside diameter toward the outside diameter.

Figure 13:
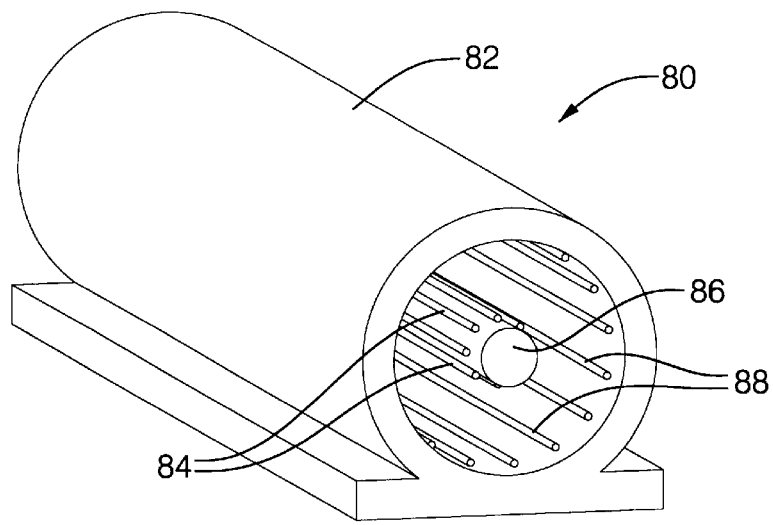
FIG. 13 is an isometric view of another furnace apparatus embodied by the present invention.
Figure 15:
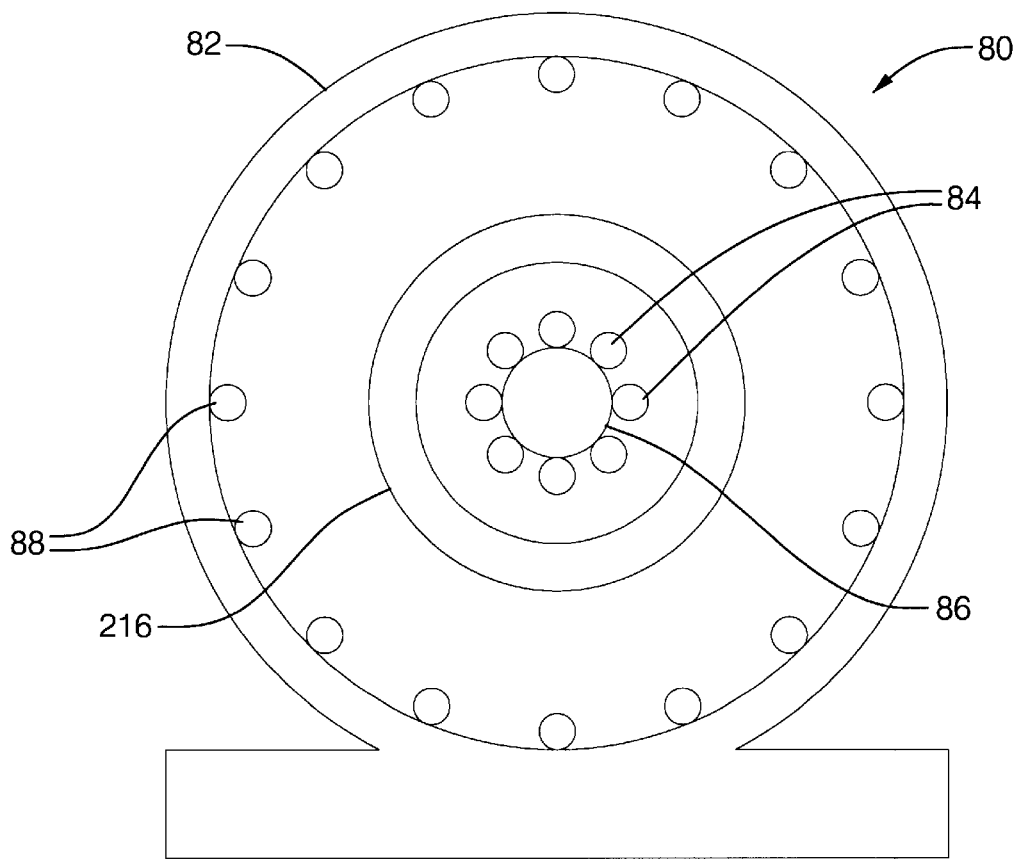
FIG. 15 is a front view of the furnace apparatus of FIGS. 13 and 14.
Figure 14:
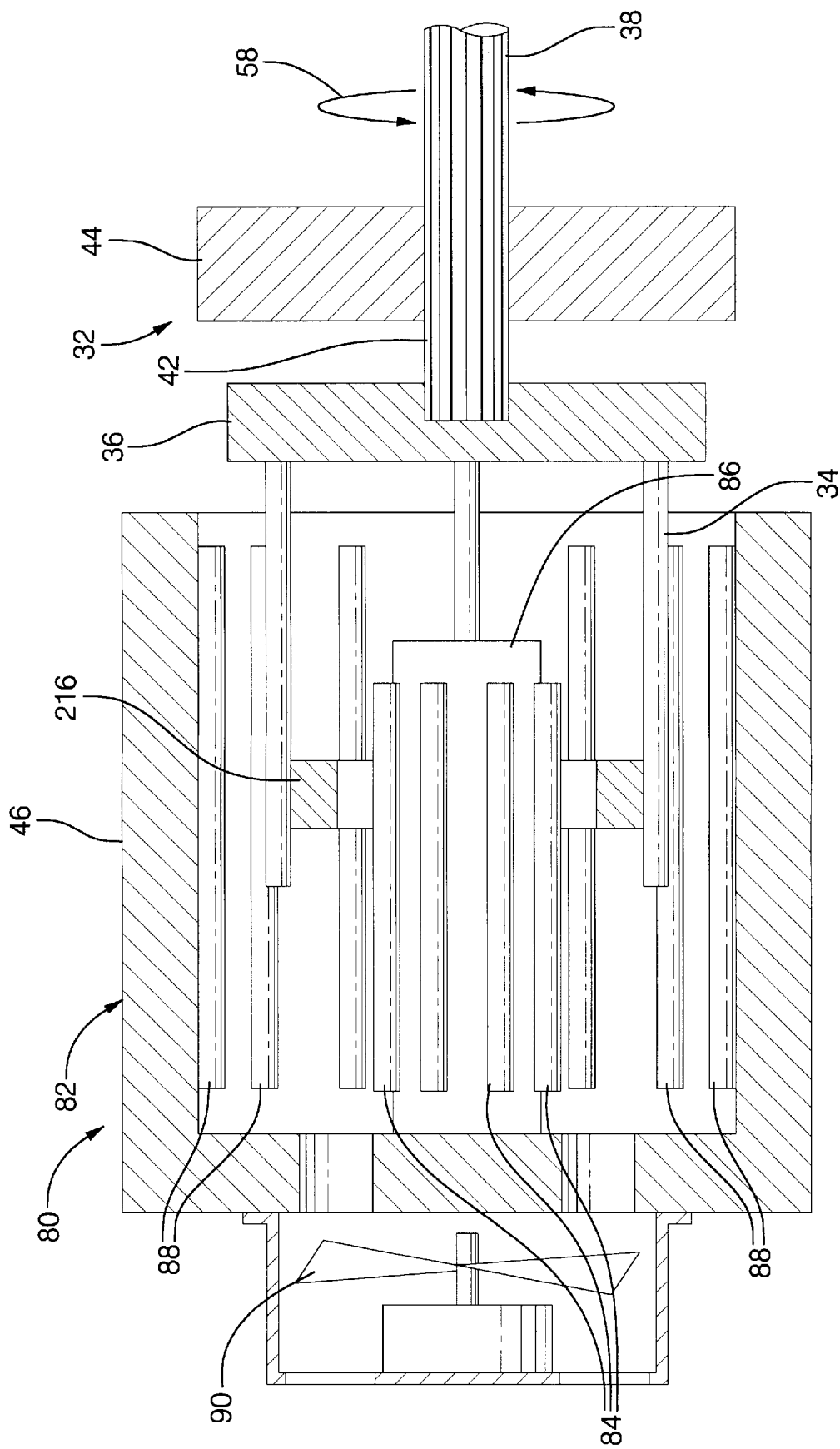
FIG. 14 is a sectional view of the furnace apparatus of FIG. 13.

Referring now to FIGS. 13–15, an alternate embodiment for heating ring 216 for expansion and/or melting is depicted. A furnace 80 includes infrared sources arranged to expose both the inside diameter and outside diameter of ring 216 to infrared energy. This is particularly useful, for example, when more rapid thermal expansion is desired. Furnace 80 includes a furnace housing 82, a plurality of inside diameter infrared sources 84 mounted within the housing on a support 86, a plurality of outside diameter infrared sources 88 mounted to the housing 82 and a fan 90 arranged to operably communicate with furnace 80. Furnace housing 82, support 86 and fan 90 are similar to furnace housing 46, support 52 and fan 56 described above with reference to FIGS. 2 and 3.

Inside diameter infrared sources 84 are powered by conventional means as described above and are positioned in a radial arrangement upon the outer surface of support 86 and are supported by conventional means such as brackets or clips (not shown). Outside diameter infrared sources 88 are powered by conventional means and are positioned in a radial arrangement upon the inner surface of furnace housing 82 and are supported by conventional means such as brackets or clips (not shown). In one embodiment, inside diameter infrared sources 84 and outside diameter infrared sources 88 are connected to the same power source. Each set of sources 84 and 88 can preferably be separately controllable. In another embodiment, inside diameter infrared sources 84 and outside diameter infrared sources 88 are connected to separate power sources generally for separate control. It is contemplated that furnace 80 can be employed for only inside diameter ring heating, wherein no power is provided to outside diameter infrared sources 88.

Referring specifically to FIG. 14, furnace fixture 32 having ring 216 positioned within fingers 34 (as described above with respect to FIGS. 2 and 3) is inserted into furnace 80 such that the inside diameter surface of ring 216 is exposed to inside diameter infrared sources 84 and the outside diameter surface of ring 216 is exposed to outside diameter sources 88. Furnace fixture 32 is rotated as described above and removed when ring 216 has expanded to the desired size. Ring 216 is pressed over hub 218 as described above with respect to FIG. 6, wherein upon cooling, ring 216 contracts, or a portion of the material of ring 216 flows into hub 218, depending on the degree of heating of ring 216 as described above.

Figure 16:
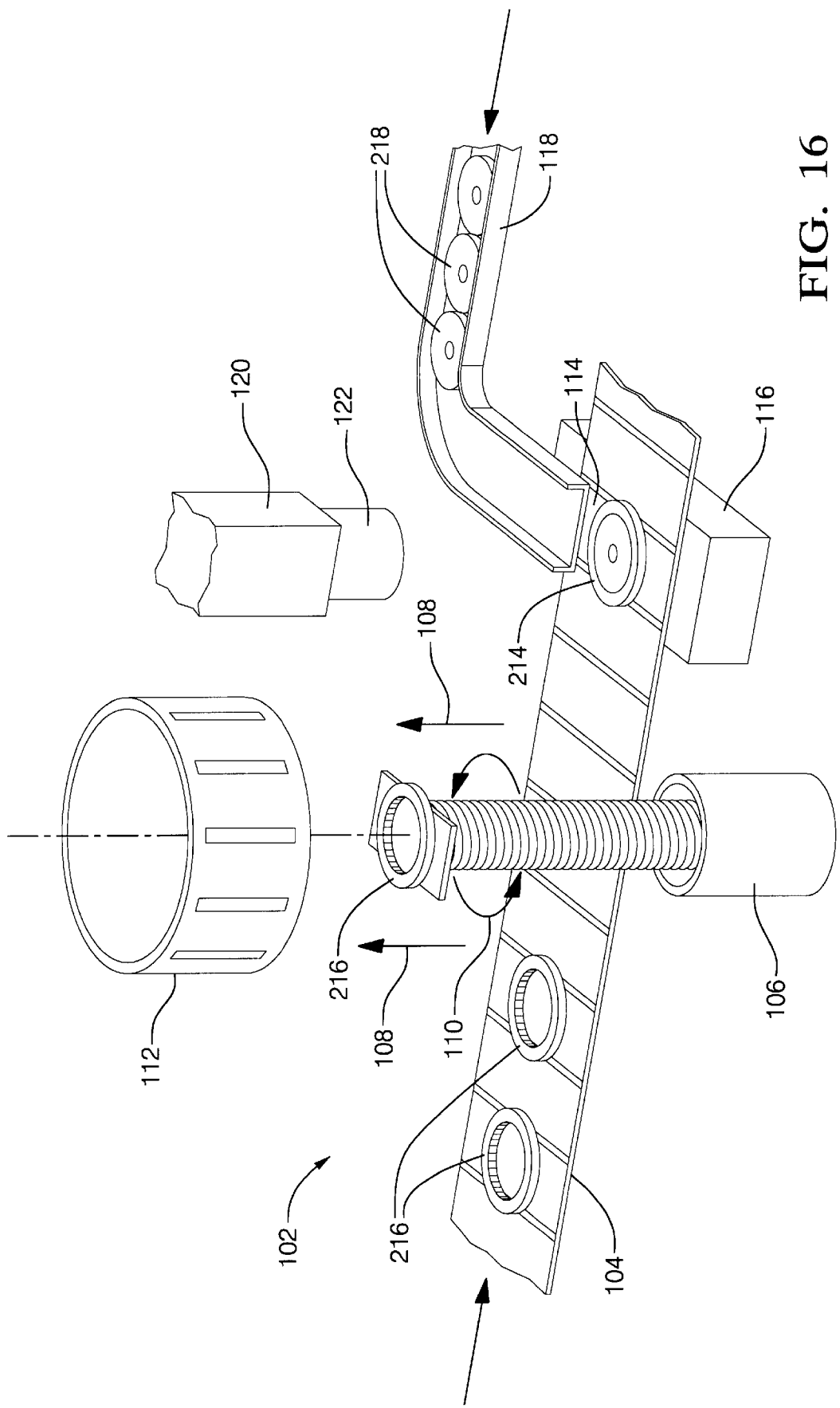
FIG. 16 is a process schematic for manufacturing a ring assembly such as depicted in FIG. 1.

Referring now to FIG. 16, an assembly line 102 for producing ring assemblies 214 is shown. Assembly line 102 includes a conveyor 104 that carries a plurality of rings 216. A ring 216 is positioned over a lift device 106 capable of lifting ring 216 upward as indicated by arrow 108 and rotating as indicated by arrow 110. Lift device 106 lifts ring 216 into an infrared chamber 112 and rotates ring 216 for uniform heating and expansion. Conveyor 104 moves non-continuously as to allow one ring 216 to be heated without moving the other rings 216. Lift device 106 can be, for example, a device similar to furnace fixture 32 as described above, with the addition of lifting capabilities. The source arrangement of infrared chamber 112 can be similar to that of furnace 30 (described above with reference to FIGS. 2 and 3) or furnace 80 (described above with reference to FIGS. 13–15).

When ring 216 has expanded to the desired size (or sufficiently melted), lift device 106 removes ring 216 from infrared chamber 112 and returns ring 216 to conveyor 104. Conveyor 104 then carries ring 216 to a press station 114, while carrying another ring 216 to lift device 106 for insertion into infrared chamber 112. At press station 114, an expanded ring 216 is positioned upon a support 116 and a hub 218 is positioned upon ring 216 by a feed device 118. A press 120 is configured and positioned to press fit hub 218 into the expanded (or melted) ring 216. Press 120 can be, for example, a hydraulic press having a solid or hollow cylinder 122 configured for pressing hub 218. Alternatively, press 120 can be substituted with a device similar to assembly fixture 62 described above with respect to FIG. 6.

Figure 17:
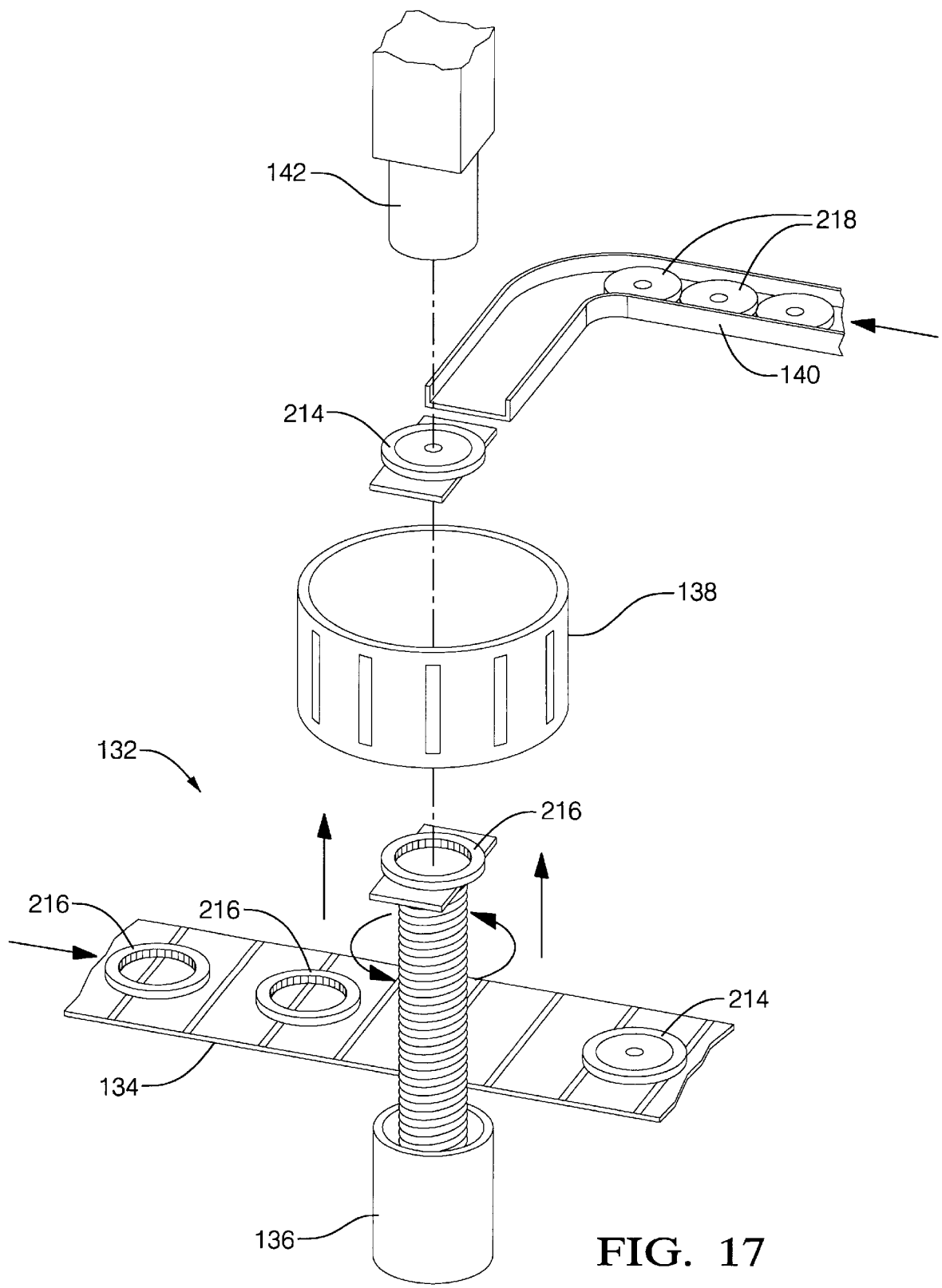
FIG. 17 is an alternative process schematic for manufacturing a ring assembly such as depicted in FIG. 1.

Referring to FIG. 17, an alternative assembly line 132 is shown. Assembly line 132 includes a conveyor 134 that is similar to conveyor 104 described with reference to FIG. 16 (non-continuous traverse). Conveyor 134 carries rings 216 such that one ring 216 is positioned over a lift device 136. Lift device 136 is similar to lift device 106 described above with reference to FIG. 16. Lift device 136 introduces one ring 216 into an infrared chamber 138 and can rotate ring 216 for uniform heating and expansion (if necessary). The source arrangement of infrared chamber 138 can be similar to that of furnace 30 (described above with reference to FIGS. 2 and 3) or furnace 80 (described above with reference to FIGS. 13–15).

The top end of infrared chamber 138 is open to allow lift device 136 to pass therethrough (shown by phantom lines). Alternatively, the top end of infrared chamber 138 can have a door that opens to allow lift device 136 to pass therethrough. In either configuration, lift device 136 holds ring 216 above infrared chamber 138. A feed device 140 feeds a hub 218 atop ring 216. A press 142 is positioned above infrared chamber 138 and press fits hub 218 within ring 216 while ring 216 is supported by lift device 136. Press 142 is similar to press 120 described above with reference to FIG. 16. Lift device 136 then retracts and places the assembled ring assembly 214 on conveyor 134 where it is removed.

The assembly process described with respect to FIG. 17 can be varied to allow ring 216 and hub 218 to be press fit within chamber 138 and then removed. This would provide infrared energy to ring assembly 214 and allow a bond between hub 218 and ring 216 to be formed by induction from hub 218.

In an additional variation of the process described with respect to FIG. 17, press 142 and chamber 138 can be arranged such that upon heating of ring 216, lift device 136 removes ring 216. Chamber 138 is moved, for example, with a linear or rotational traverse or robotic arm, and press 142 and feed device 140 are positioned over lift device 136 to press fit a hub 218 and form a ring assembly 214.

Figure 18:
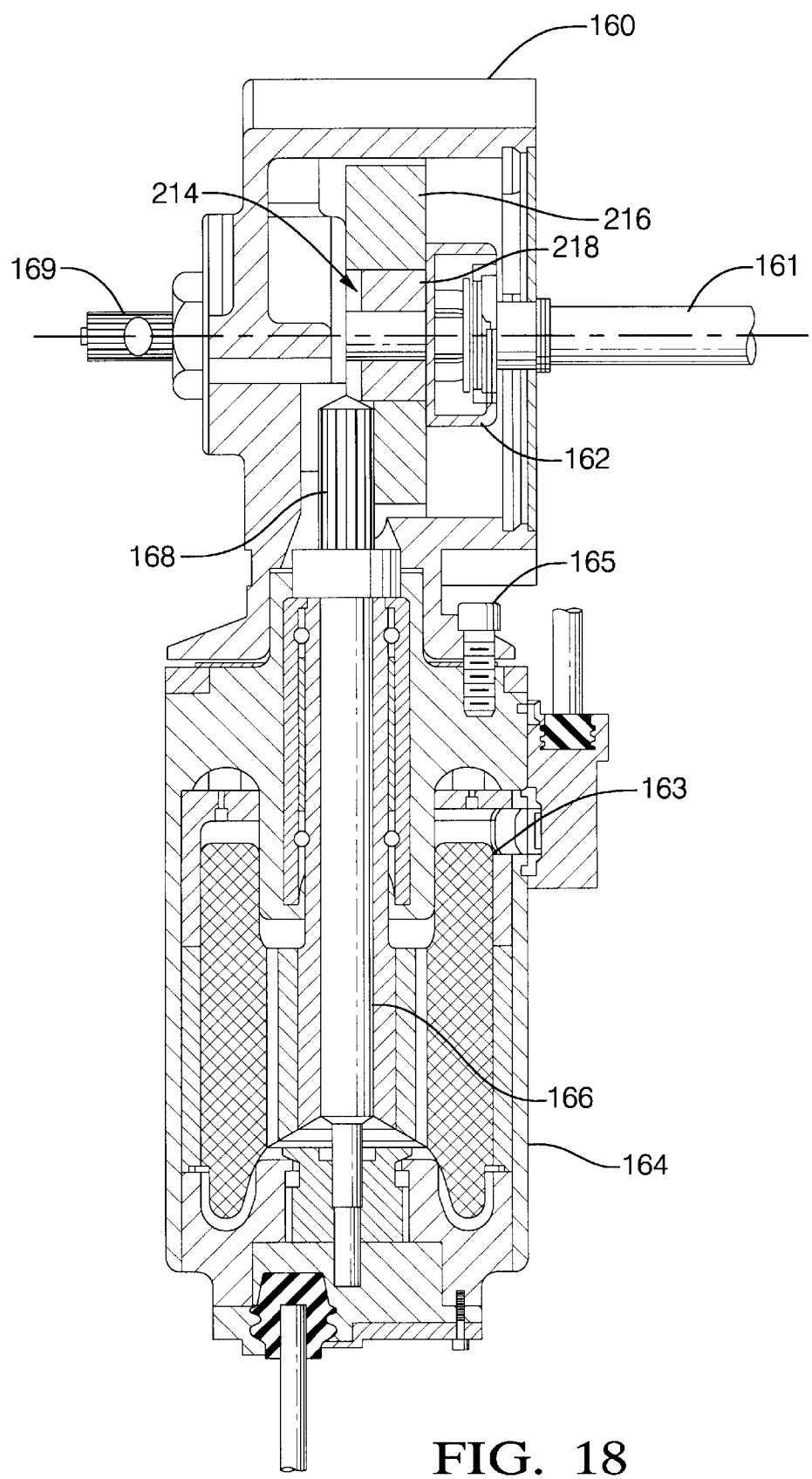
FIG. 18 depicts a power steering gearbox employing a ring assembly of the present invention.

Referring now to FIG. 18, ring assembly 214 comprising ring 216 and hub 218 is depicted as a component within a gear housing 160. In this device, ring assembly 214 is generally a face gear. Gear housing 160 is, for example, a component of an electronic power steering system. Gear housing 160 generally receives an input from an input shaft 161 interconnected to a steering column (not shown). Relative motion is transmitted to a torque sensor 162. Torque sensor 162 generally includes one or more torsion bars (not shown) to determine the amount of force applied via input shaft 161. This force quantity is typically electronically processed and provides a signal to an electric motor 163. Electric motor 163 is within a motor housing 164 that attaches to gear housing 160 via one or more bolts 165. Motor 163 causes a shaft 166 having a pinion 168 at the end thereof to rotate. The rotation of pinion 168, mesh with a face of ring assembly 214, rotates an output shaft 169 extending from gear housing 160.

The above embodiments have been described with reference to the Figures wherein a certain number of infrared sources are depicted. However, it is contemplated that the number of infrared sources can vary. A plurality of sources can be tightly arranged, for example, to intensify the infrared energy emission. Furthermore, the use of a tightly arranged configuration of infrared sources can eliminate the need for rotating ring 216 within the furnace and allowing for use of a simplified lift device (such as lift device 106 or lift device 136) or furnace fixture 32.

Alternatively, a single infrared source can be arranged to allow ring 216 to rotate about that source such that the inside diameters or outside diameter surface is exposed to the infrared source. Where a single source is used to heat the inside diameter surface, it can be positioned on, for example, a ring support as described above, or can be installed within a furnace or chamber such that the infrared energy is emitted circumferentially around the source. Where a single source is used to heat the outside diameter surface, it can be mounted to the inside of the furnace or chamber with clips or brackets.

One advantage realized by the present invention is that the time required to heat ring 216 is substantially reduced compared to conventional ovens. Infrared heating has resulted in reducing the expansion process to less than 45 seconds to sufficiently expand ring 216 to press fit over hub 218.

Another advantage realized is that the infrared sources uniformly heat the polymer ring and allow the ring to expand to a controlled and predictable size. This uniform heating makes the polymer ring attached to the metal hub more securely.

Furthermore, the infrared sources selectively heat specific areas of the ring. In certain embodiments, only the inside surface diameter is heated. Alternatively, the selectivity can be more specific, for example, to conform to specific features on its outside diameter surface of hub 218, for example, as indicated above with reference to FIGS. 7–12.

Yet another advantage is the short cooling time, which stems generally from the selective heating. Since a portion of ring 216 is heated, rather than the entire ring 216 as in conventional methods, less cooling time is required as compared to conventional methods.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for manufacturing a ring assembly comprising a ring and a hub, said apparatus comprising:
   an infrared source emitting infrared energy,
   a ring support, said ring support positioning said ring such that said ring is exposed to said infrared energy in sufficient quantity to expand an inside diameter surface of said ring and to melt at least a portion of said inside diameter surface, and
   a press for assembling said ring and said hub.
2. An apparatus as in claim 1, wherein said infrared source comprises at least one infrared bulb.
3. An apparatus as in claim 1, wherein said ring has an outside diameter surface, said outside diameter surface being exposed to said infrared energy.
4. An apparatus as in claim 3, wherein said inside diameter surface and said outside diameter surface are exposed to said infrared energy at different rates.
5. An apparatus as in claim 1, wherein said ring is formed of a polymeric material.
6. An apparatus as in claim 5, wherein said polymeric material is nylon.
7. An apparatus as in claim 1, wherein said hub is a metal, polymeric, or ceramic material.
8. A method of manufacturing an assembly comprising an outer ring and a inner ring, said method comprising:
   exposing said outer ring to a quantity of infrared energy from an infrared source to elevate the temperature of at least a portion of said outer ring, said outer ring having an inside diameter having a surface, said quantity of infrared energy being applied to said inside diameter surface causing said inside diameter to increase while the temperature is elevated and at least a portion of said inside diameter surface becomes at least partially melted;
   urging said outer ring and said inner ring into engagement after said outer ring has been exposed to said quantity of infrared energy; and
   allowing said outer ring to cool such that said inside diameter decreases when the temperature decreases such that said outer ring contracts and secures said inner ring.
9. The method as in claim 8, further comprising:
   allowing material from said at least partially melted portion to flow into a recess defined by at least one feature on said inner ring prior to cooling.
10. The method as in claim 8, further comprising selecting said outer ring from one or more polymer materials.
11. The method of manufacturing a ring assembly as in claim 8, further comprising selecting said inner ring from one or more metal materials, one or more polymer materials, or one or more ceramic materials.
12. An electronic power steering system comprising:
   a steering control;
   an input shaft coupled to said steering control;
   a sensor coupled to said input shaft;
   a processing device coupled to said sensor;
   a motor coupled to said processing device;
   a pinion coupled to said motor;
   a gear assembly coupled to said pinion; and
   an output shaft coupled to said gear assembly,
      wherein activation of said steering control transmits motion to said input shaft, said sensor sensing data from said input shaft and transmitting said data to said processing device, said processing device signaling said motor to activate, said activation of said motor causing said pinion to rotate and transmit force to said gear assembly, said gear assembly transmitting force to said output shaft, and
      further wherein said gear assembly comprises an outer ring and an inner ring, said outer ring forming an interference fit and a melt bond with said inner ring after said outer ring has been exposed to infrared energy.
13. An apparatus as in claim 12, wherein an outside surface of said inner ring further includes features being configured to provide said melt bond with axial and traverse strength.

14. A method of manufacturing a ring assembly, comprising:

expanding an inner opening of an outer member via exposure to an infrared energy source;

melting a portion of a surface of said inner opening via exposure to said infrared energy source to form a melted portion;

placing an inner member in said inner opening of said outer member, said inner member being configured to be received within said inner opening; and cooling said ring assembly wherein said inner opening decreases in size and forms an interference fit with said inner member and said melted portion from an adhesive bond with a portion of said inner member.

15. A method as in claim 14, wherein said inner member is configured to have a plurality of features for receiving said melted portion of said outer member.

16. A method as in claim 14, further comprising:

rotating either said outer member or said infrared energy source such that said inner opening is uniformly exposed to said infrared energy source.

17. An apparatus for manufacturing a ring assembly, comprising:

a support for receiving and engaging an outer member having an inner opening;

an infrared source, said support being adapted to expose said outer member to said infrared source, said infrared source being configured to provide infrared energy to expand said inner opening and melt a portion of said inner opening; and a press for receiving and engaging said outer member after said other member has been exposed to said infrared energy of said infrared source, said press providing an urging force to position an inner member into said inner opening of said outer member.

18. The apparatus as in claim 17, wherein said support comprises a plurality of spring loaded fingers being adapted allow for the expansion of said inner opening as said outer member is exposed to said infrared energy.

19. A ring assembly, comprising:

an outer member having an inner opening;

an inner member being secured within said inner opening by an interference fit and adhesive bond caused by the cooling and solidification of a portion of said outer member after exposure to an infrared energy source.

20. The ring assembly as in claim 19, wherein said outer member is a polymeric material.

21. The ring assembly as in claim 19, wherein said inner member is a metal, ceramic, or polymer hub.

* * * * *